US011316178B2

(12) United States Patent
Ohmori et al.

(10) Patent No.: US 11,316,178 B2
(45) Date of Patent: Apr. 26, 2022

(54) CHECKING METHOD OF RESIN-FRAMED MEMBRANE ELECTRODE ASSEMBLY (71) Applicant: HONDA MOTOR CO., LTD., Tokyo (JP)

(72) Inventors: Suguru Ohmori, Wako (JP); Masashi Sugishita, Wako (JP); Seiji Sugiura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 187 days.

(21) Appl. No.: 16/412,420

(22) Filed: May 15, 2019

(65) Prior Publication Data

US 2019/0273270 A1 Sep. 5, 2019

Related U.S. Application Data (62) Division of application No. 15/220,392, filed on Jul. 27, 2016, now abandoned.

(30) Foreign Application Priority Data

Jul. 29, 2015 (JP) ................................. 2015-149323

(51) Int. Cl.
| | |
|---|---|
| *H01M 8/0273* | (2016.01) |
| *H01M 8/1004* | (2016.01) |
| *H01M 8/242* | (2016.01) |
| H01M 8/0265 | (2016.01) |
| H01M 8/10 | (2016.01) |
| H01M 8/04089 | (2016.01) |

(52) U.S. Cl.
CPC ....... *H01M 8/0273* (2013.01); *H01M 8/1004* (2013.01); *H01M 8/242* (2013.01); *H01M 8/0265* (2013.01); *H01M 8/04104* (2013.01); *H01M 2008/1095* (2013.01)

(58) Field of Classification Search
CPC .. H01M 8/0273; H01M 8/242; H01M 8/1004; H01M 8/04104; H01M 8/0265; H01M 2008/1095; Y02E 60/50
See application file for complete search history.

(56) References Cited

U.S. PATENT DOCUMENTS

| | | | |
|---|---|---|---|
| 2011/0151350 A1 | 6/2011 | Iverson et al. | |
| 2015/0086887 A1* | 3/2015 | Matsuo | ............... H01M 8/2457 |
| | | | 429/423 |
| 2916/0013504 | 1/2016 | Yamamoto et al. | |

FOREIGN PATENT DOCUMENTS

| | | |
|---|---|---|
| JP | 2011-028852 | 2/2011 |
| JP | 2015-060621 | 3/2015 |
| JP | 2015-090793 | 5/2015 |

OTHER PUBLICATIONS

Japanese Office Action for corresponding JP Application No. 2015-149323, dated Mar. 21, 2017 (w/ English machine translation).
Election of species requirement issued by the United States Patent and Trademark Office for the parent U.S. Appl. No. 15/220,392, filed Feb. 9, 2018.
Non-final office action issued by the United States Patent and Trademark Office for the parent U.S. Appl. No. 15/220,392, filed Jun. 14, 2018.
Final office action issued by the United States Patent and Trademark Office for the parent U.S. Appl. No. 15/220,392, filed Feb. 15, 2019.

* cited by examiner

*Primary Examiner* — Muhammad S Siddiquee
(74) *Attorney, Agent, or Firm* — Mori & Ward, LLP (57) ABSTRACT A checking method of a resin-framed membrane electrode assembly includes checking whether there is breakage in one of short sides of a first rectangular peripheral shape of a clearance provided in the resin-framed membrane electrode assembly without checking whether there is breakage in any other part of the clearance, the resin-framed membrane assembly including a solid polymer electrolyte membrane, a gas diffusion layer provided on the solid polymer electrolyte membrane, and a resin frame member that has a second rectangular peripheral shape and surrounds the solid polymer electrolyte membrane and the gas diffusion layer to provide the clearance between the resin frame member and the gas diffusion layer, the solid polymer electrolyte membrane being made from a solid polymer electrolyte membrane roll in which a solid polymer electrolyte membrane sheet is wound in a winding direction, long sides of the rectangular peripheral shape extending in the winding direction.

8 Claims, 5 Drawing Sheets

CHECKING METHOD OF RESIN-FRAMED MEMBRANE ELECTRODE ASSEMBLY

CROSS-REFERENCE TO RELATED APPLICATIONS

The present application is a divisional application of the U.S. patent application Ser. No. 15/220,392 filed Jul. 27, 2016, which claims priority under 35 U.S.C. § 119 to Japanese Patent Application No. 2015-149323, filed Jul. 29, 2015, entitled "Resin-Framed Membrane Electrode Assembly and Fuel Cell." The contents of these applications are incorporated herein by reference in their entirety.

BACKGROUND

1. Field

The present disclosure relates to a checking method of a resin-framed membrane electrode assembly for a fuel cell.

2. Description of the Related Art

In general, a solid polymer electrolyte fuel cell includes a solid polymer electrolyte membrane, which is a solid polymer ion-exchange membrane. The fuel cell includes a membrane electrode assembly (MEA), in which an anode electrode is disposed on one surface of the solid polymer electrolyte membrane and a cathode electrode is disposed on the other surface of the solid polymer electrolyte membrane. The anode electrode and the cathode electrode each include a catalyst layer (electrode catalyst layer) and a gas diffusion layer (porous carbon).

A membrane electrode assembly and separators (bipolar plates) sandwiching the membrane electrode assembly therebetween constitute a power generation cell (unit fuel cell). A predetermined number of such power generation cells are stacked and used, for example, as a vehicle fuel cell stack.

There is a type of membrane electrode assembly in which one of the gas diffusion layers has smaller planar dimensions than the solid polymer electrolyte membrane and the other gas diffusion layer has the same planar dimensions as the solid polymer electrolyte membrane. Such a membrane electrode assembly is called a stepped MEA. A stepped MEA is typically structured as a resin-framed MEA, which has a resin frame member in an outer periphery thereof, so that the amount of the solid polymer electrolyte membrane, which is comparatively expensive, can be reduced and so that the solid polymer electrolyte membrane, which is a thin and weak, can be protected.

Japanese Unexamined Patent Application Publication No. 2015-60621 describes a resin-framed membrane electrode assembly for a fuel cell, which is an example of a resin-framed MEA of a known type. The resin-framed membrane electrode assembly for a fuel cell includes a solid polymer electrolyte membrane, a first electrode disposed on one surface of the solid polymer electrolyte membrane, and a second electrode disposed on the other surface of the solid polymer electrolyte membrane. The planar dimensions of the first electrode are larger than those of the second electrode. A resin frame member is disposed so as to surround the outer periphery of the solid polymer electrolyte membrane.

The resin frame member includes an inwardly-protruding portion, which is thin and which protrudes from an inner base portion toward the second electrode. An adhesive application portion, to which an adhesive is applied, is disposed on the inwardly-protruding portion so as to surround a part of the inwardly-protruding portion that contacts the membrane electrode assembly. A resin-impregnated portion is disposed on the inner base portion of the resin frame member. The resin-impregnated portion is formed by impregnating an outer edge of the first electrode with a resin material so that the first electrode and the resin frame member are integrated with each other.

SUMMARY

According to one aspect of the present invention, a checking method of a resin-framed membrane electrode assembly for a fuel cell is provided. The resin-framed membrane electrode assembly includes a rectangular stepped membrane electrode assembly. The rectangular stepped membrane electrode assembly includes a solid polymer electrolyte membrane, a first electrode, and a second electrode. The solid polymer electrolyte membrane is made from a solid polymer electrolyte membrane roll in which a solid polymer electrolyte membrane sheet is wound in a winding direction. The solid polymer electrolyte membrane has a first surface, a second surface opposite to the first surface in a stacking direction, and an outer peripheral surface connecting the first surface and the second surface. The first electrode is disposed on the first surface of the solid polymer electrolyte membrane in the stacking direction. The second electrode is disposed on the second surface of the solid polymer electrolyte membrane and has a size smaller than a size of the first electrode viewed in the stacking direction. The second electrode includes a second electrode catalyst layer and a second gas diffusion layer. The second electrode catalyst layer is provided on the second surface of the solid polymer electrolyte membrane in the stacking direction. The second gas diffusion layer is provided on the second electrode catalyst layer in the stacking direction. The resin frame member has a rectangular peripheral shape and a rectangular window in the rectangular peripheral shape as viewed in the stacking direction. The rectangular stepped membrane electrode assembly is provided in the rectangular window so that the outer peripheral surface of the solid polymer electrolyte membrane is surrounded by the resin frame member. The resin frame member includes an inwardly-protruding peripheral portion which protrudes toward an outer peripheral edge of the second electrode. The inwardly-protruding peripheral portion has an inner peripheral edge facing the outer peripheral edge of the second gas diffusion layer with a clearance therebetween. The rectangular peripheral shape has longitudinal sides which extend in the winding direction and short sides shorter than the longitudinal sides. The checking method includes checking whether there is breakage in one of the short sides of the rectangular peripheral shape in the clearance without checking breakage in any other part than the one of the shorter sides in the clearance.

According to another aspect of the present invention, a checking method of a resin-framed membrane electrode assembly for a fuel cell includes checking whether there is breakage in one of short sides of a first rectangular peripheral shape of a clearance provided in the resin-framed membrane electrode assembly without checking whether there is breakage in any other part of the clearance. The resin-framed membrane assembly includes a solid polymer electrolyte membrane, a gas diffusion layer provided on the solid polymer electrolyte membrane, and a resin frame member that has a second rectangular peripheral shape and surrounds the solid polymer electrolyte membrane and the gas diffusion layer to provide the clearance between the resin frame member and the gas diffusion layer. The solid polymer electrolyte membrane is made from a solid polymer electrolyte membrane roll in which a solid polymer electrolyte membrane sheet is wound in a winding direction. Long sides of the first rectangular peripheral shape extend in the winding direction. The long sides being longer than the short sides and substantially perpendicular to the short sides.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
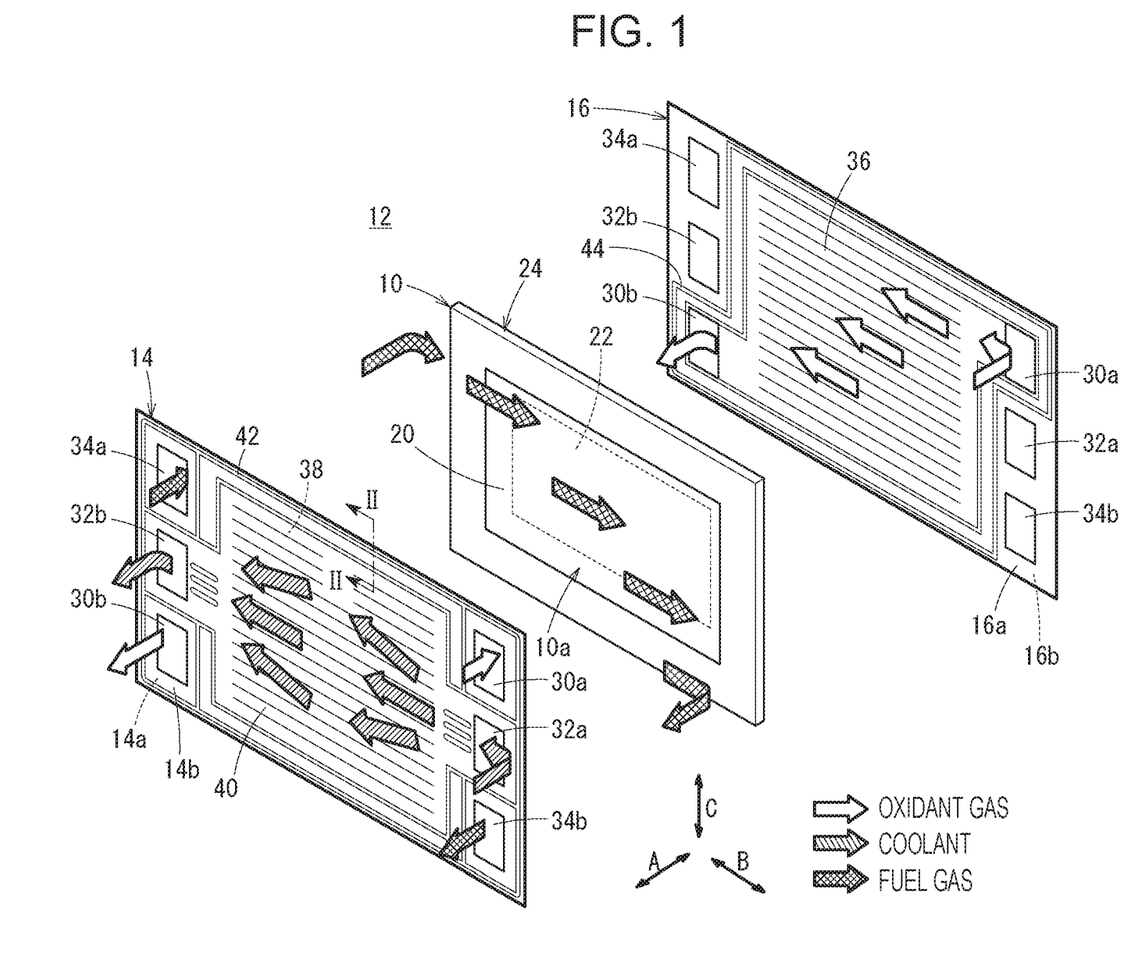
FIG. 1 is an exploded perspective view of a solid polymer electrolyte power generation cell including a resin-framed membrane electrode assembly according to an embodiment of the present disclosure.
Figure 2:
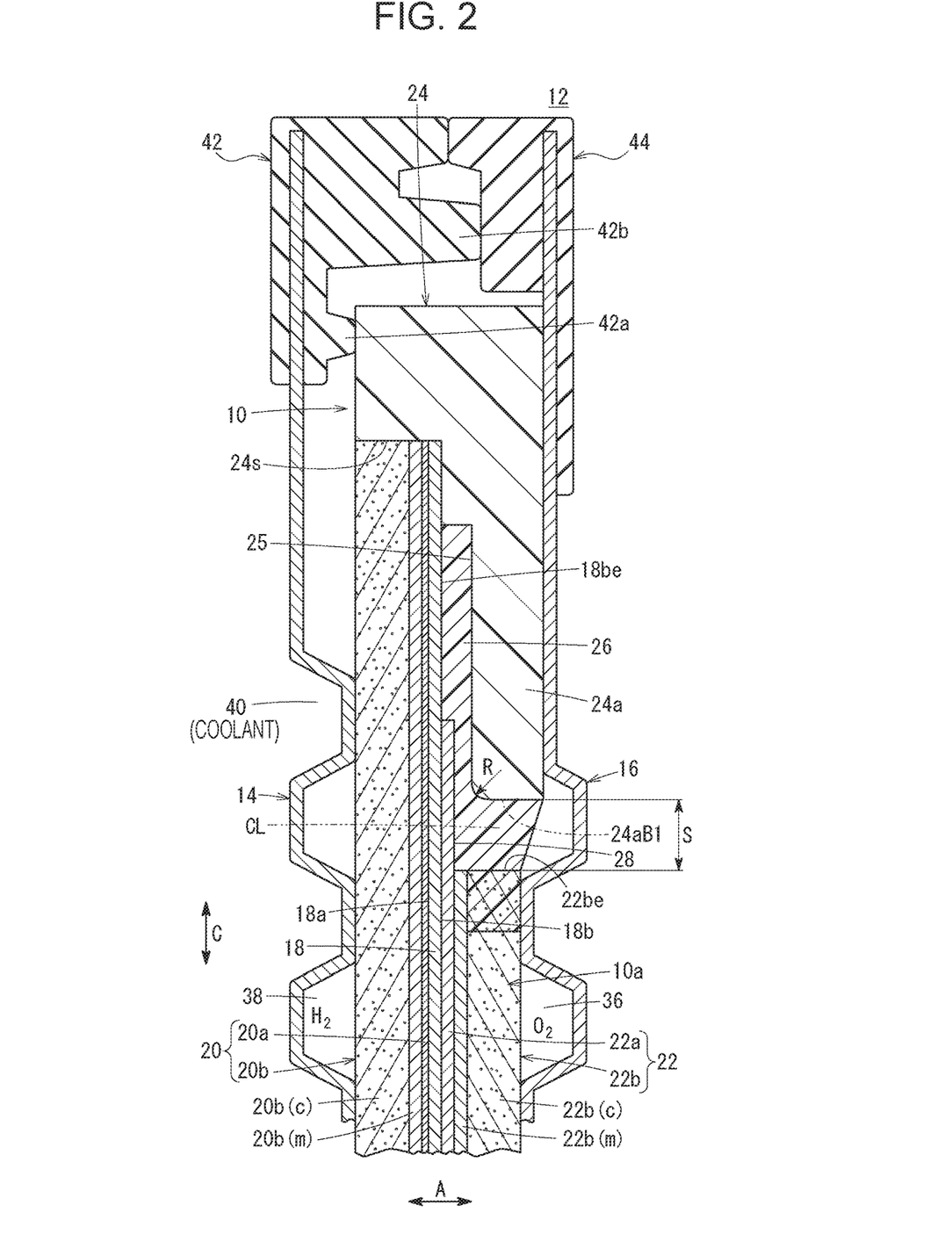
FIG. 2 is a sectional view of the power generation cell taken along line II-II in FIG. 1.

As illustrated in FIGS. 1 and 2, a resin-framed membrane electrode assembly 10 according to an embodiment of the present disclosure is incorporated in a solid polymer power generation cell 12 (fuel cell), which has a horizontally elongated (or vertically elongated) rectangular shape. A plurality of power generation cells 12 form a fuel cell stack by being stacked, for example, in the direction of arrow A (horizontal direction) or in the direction of arrow C (direction of gravity). The fuel cell stack is mounted, for example, as a vehicle fuel cell stack in a fuel cell electric vehicle (not shown).

In the power generation cell 12, the resin-framed membrane electrode assembly 10 is sandwiched between a first separator 14 and a second separator 16. The first separator 14 and the second separator 16 each have a horizontally elongated (or vertically elongated) rectangular shape. The first separator 14 and the second separator 16 are each made of a metal plate, a carbon plate, or the like. Examples of the metal plate include a steel plate, a stainless steel plate, an aluminum plate, a galvanized steel plate, and the like, whose surface may have an anti-corrosive coating.

The resin-framed membrane electrode assembly 10, which has a rectangular shape, includes a rectangular stepped MEA 10a. As illustrated in FIG. 2, the stepped MEA 10a includes a solid polymer electrolyte membrane 18 (cation exchange membrane), which is, for example, a thin film that is made of a perfluorosulfonic acid polymer and soaked with water. The solid polymer electrolyte membrane 18 is sandwiched between an anode electrode 20 (first electrode) and a cathode electrode 22 (second electrode). Instead of a fluorinated electrolyte, a hydrocarbon (HC) electrolyte may be used as the solid polymer electrolyte membrane 18.

The cathode electrode 22 has smaller planar dimensions (outside dimensions) than the solid polymer electrolyte membrane 18 and the anode electrode 20. Alternatively, the anode electrode 20 may have smaller planar dimensions than the solid polymer electrolyte membrane 18 and the cathode electrode 22. In this case, the anode electrode 20 is the second electrode, and the cathode electrode 22 is the first electrode.

The anode electrode 20 includes a first electrode catalyst layer 20a, which is joined to a surface 18a of the solid polymer electrolyte membrane 18, and a first gas diffusion layer 20b, which is stacked on the first electrode catalyst layer 20a. The first electrode catalyst layer 20a and the first gas diffusion layer 20b have the same planar dimensions that are the same as (or smaller than) those of the solid polymer electrolyte membrane 18.

The cathode electrode 22 includes a second electrode catalyst layer 22a, which is joined to a surface 18b of the solid polymer electrolyte membrane 18, and a second gas diffusion layer 22b, which is stacked on the second electrode catalyst layer 22a. The second electrode catalyst layer 22a protrudes outward beyond an outer edge 22be of the second gas diffusion layer 22b, has larger planar dimensions than the second gas diffusion layer 22b, and has smaller planar dimensions than the solid polymer electrolyte membrane 18.

The second electrode catalyst layer 22a and the second gas diffusion layer 22b may have the same planar dimensions, and the second electrode catalyst layer 22a may have smaller planar dimensions than the second gas diffusion layer 22b.

The first electrode catalyst layer 20a is formed by, for example, uniformly coating a surface of the first gas diffusion layer 20b with porous carbon particles whose surfaces support a platinum alloy. The second electrode catalyst layer 22a is formed by, for example, uniformly coating a surface of the second gas diffusion layer 22b with porous carbon particles whose surfaces support a platinum alloy.

The first gas diffusion layer 20b includes a microporous layer 20b(m), which is porous and electroconductive, and a carbon layer 20b(c), which is made of carbon paper, carbon cloth, or the like. The second gas diffusion layer 22b includes a microporous layer 22b(m) and a carbon layer 22b(c), which is made of carbon paper, carbon cloth, or the like.

The planar dimensions of the second gas diffusion layer 22b are smaller than those of the first gas diffusion layer 20b. The first electrode catalyst layer 20a and the second electrode catalyst layer 22a are formed on both surfaces of the solid polymer electrolyte membrane 18. The microporous layers 20b(m) and 22b(m) may be omitted as appropriate.

The resin-framed membrane electrode assembly 10 includes a resin frame member 24 that surrounds the outer periphery of the solid polymer electrolyte membrane 18 and that is joined to the anode electrode 20 and the cathode electrode 22. Instead of the resin frame member 24, a resin film having a uniform thickness may be used.

The resin frame member 24 may be made of, for example, polyphenylene sulfide (PPS), polyphthalamide (PPA), polyethylene naphthalate (PEN), polyethersulfone (PES), liquid crystal polymer (LCP), polyvinylidene fluoride (PVDF), silicone resin, fluororesin, modified-polyphenylene ether (m-PPE) resin, polyethylene terephthalate (PET), polybutylene terephthalate (PBT), modified polyolefin, or the like.

Figure 3:
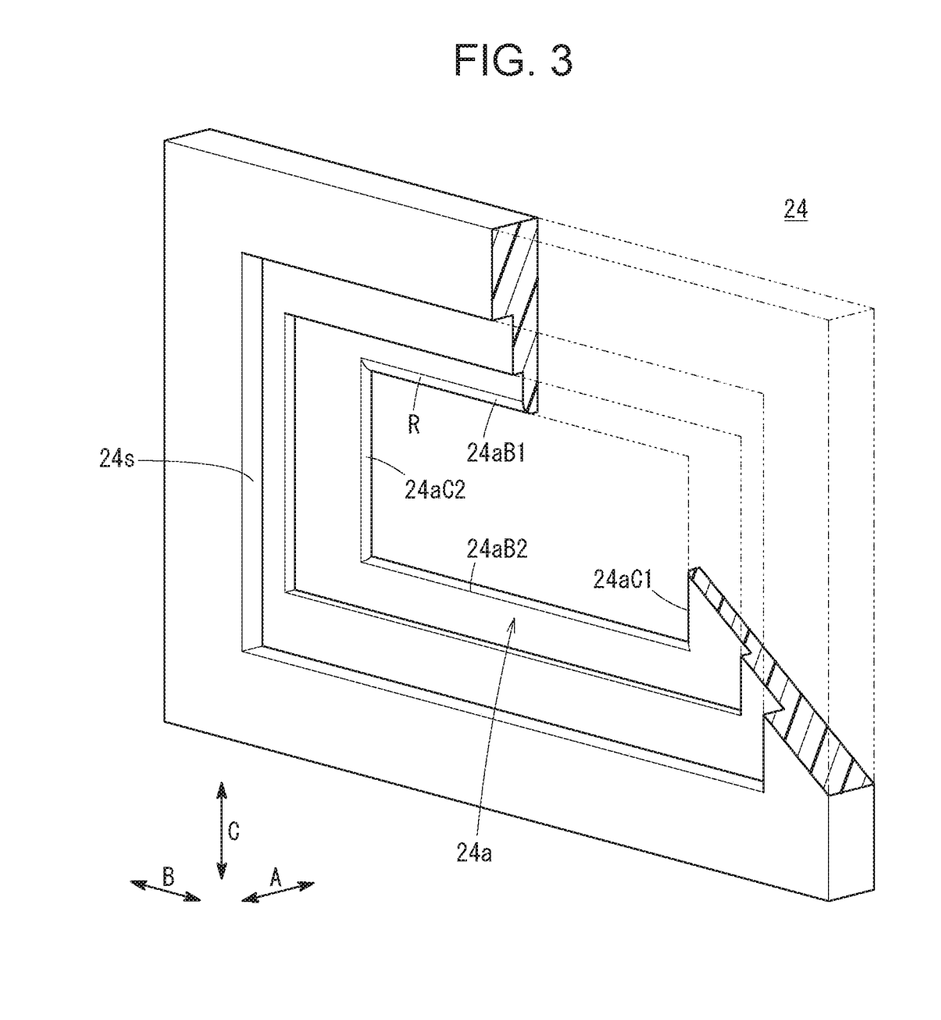
FIG. 3 is a partial sectional view of a resin frame member of the resin-framed membrane electrode assembly.

As illustrated in FIGS. 1 and 3, the resin frame member 24 has a rectangular frame-like shape. As illustrated in FIGS. 2 and 3, the resin frame member 24 has an inwardly-protruding portion 24a, which is thin and which protrudes from an inner base portion 24s toward the cathode electrode 22 via a step portion. The inwardly-protruding portion 24a extends inwardly from the inner base portion 24s by a predetermined length and is disposed so as to cover an outer peripheral surface 18be of the solid polymer electrolyte membrane 18. The inwardly-protruding portion 24a includes inner long sides 24aB1 and 24aB2 and inner short sides 24aC1 and 24aC2 (see FIG. 3), each having a curved surface R along an inner corner thereof.

Figure 4:
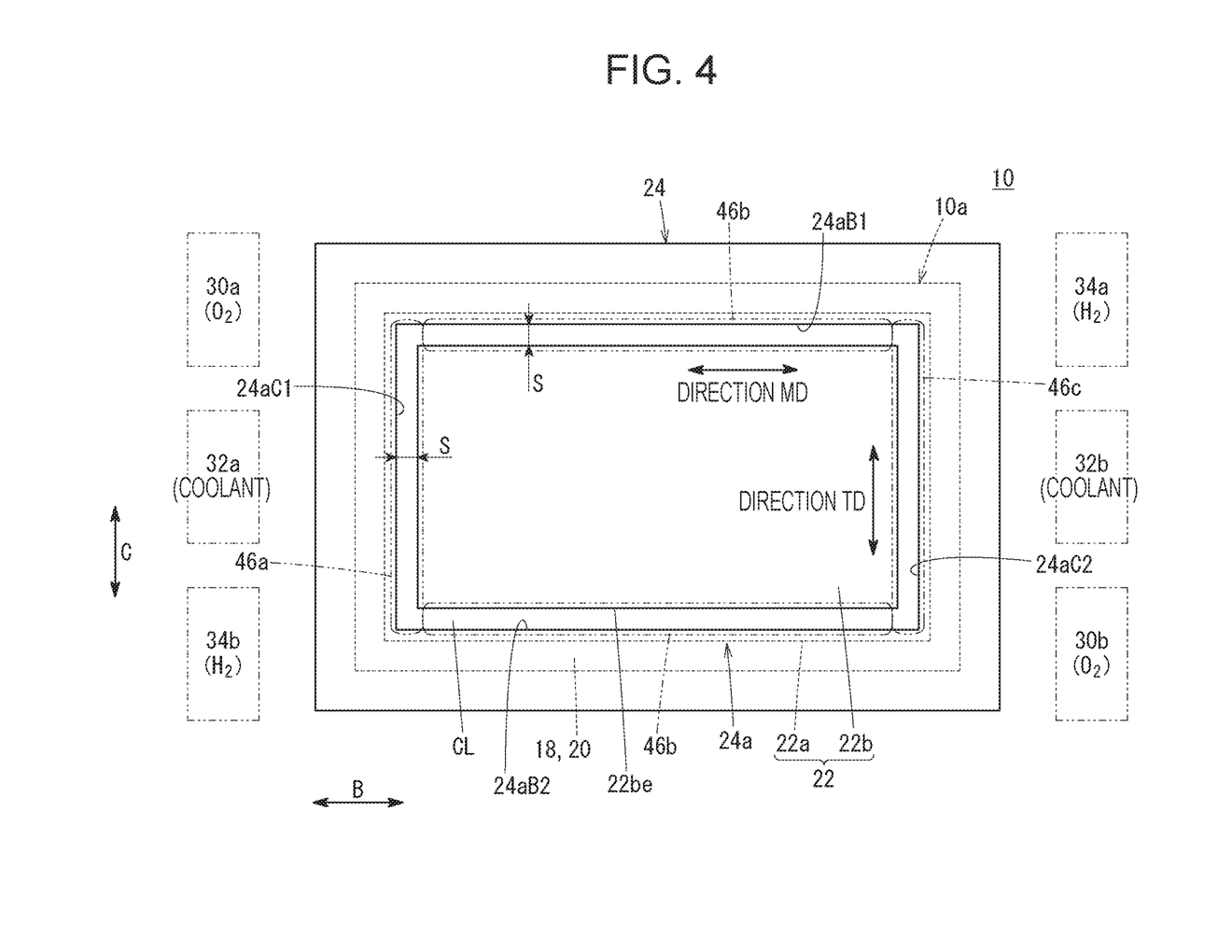
FIG. 4 is a plan view of the resin-framed membrane electrode assembly.

As illustrated in FIGS. 3 and 4, the inner long side 24aB1 is an upper side of the inner periphery of the resin frame member 24 extending in the longitudinal direction (direction of arrow B), and the inner long side 24aB2 is a lower side of the inner periphery of the resin frame member 24 extending in the longitudinal direction. The inner short side 24aC1 is one of lateral sides of the inner periphery of the resin frame member 24 extending in the transverse direction (direction of arrow C), and the inner short side 24aC2 is the other lateral side of the inner periphery of the resin frame member 24 extending in the transverse direction.

As illustrated in FIG. 2, a filling space 25 is formed between the inwardly-protruding portion 24a and the stepped MEA 10a, and an adhesive layer 26 is formed in the filling space 25. The adhesive layer 26 includes an adhesive, such as a liquid sealant or a hot-melt adhesive. The adhesive is not limited to a liquid, a solid, a thermoplastic material, or a thermosetting material.

As illustrated in FIG. 4, a frame-shaped clearance CL is formed between the outer edge 22be of the second gas diffusion layer 22b and the inner long sides 24aB1 and 24aB2 of the inwardly-protruding portion 24a and between the outer edge 22be and the inner short sides 24aC1 and 24aC2 of the inwardly-protruding portion 24a. As a result, the outer edge 22be is separated by a distance S from each of the inner long sides 24aB1 and 24aB2 and the inner short sides 24aC1 and 24aC2. The widths of parts of the clearance CL on the inner long sides 24aB1 and 24aB2 and the inner short sides 24aC1 and 24aC2 are the same as the distance S. However, the widths of the parts of the clearance CL may differ from each other.

In the present embodiment, the solid polymer electrolyte membrane 18 is manufactured on a film production line (not shown). In the film production line, a rolled solid polymer electrolyte membrane 18R is manufactured by supplying a perfluorosulfonic acid polymer solution, drying the polymer solution in a drying step, and winding the dried polymer solution into a roll shape in a winding step (see FIG. 5).

Figure 5:
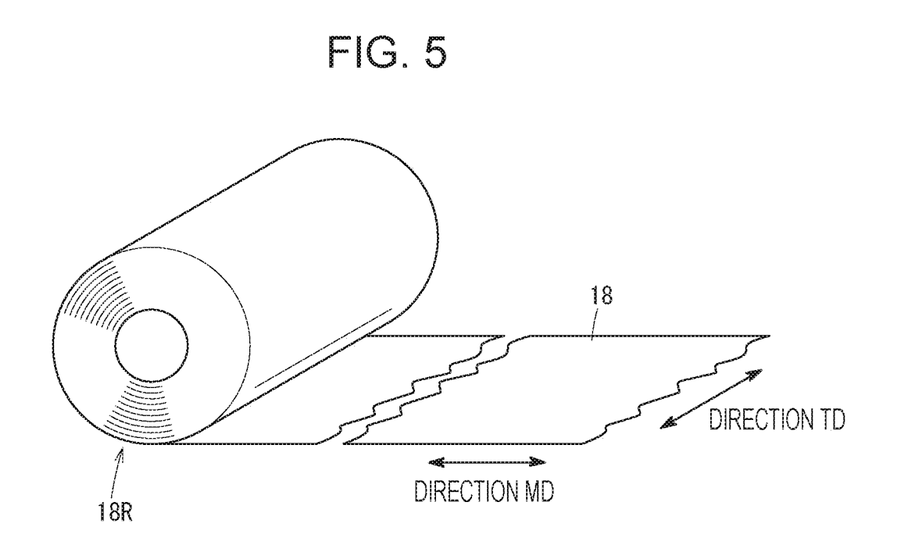
FIG. 5 is a perspective view of a rolled solid polymer electrolyte membrane.

In the drying step and the winding step, stresses are generated in the rolled solid polymer electrolyte membrane 18R. Therefore, the physical property of the rolled solid polymer electrolyte membrane 18R is anisotropic, that is, differs between the winding direction (feed direction) (hereinafter, also referred to as the "direction MD") and a direction perpendicular to the direction MD (hereinafter, also referred to as the direction TD). To be specific, a change in the dimensions of the solid polymer electrolyte membrane 18 due to expansion or contraction in the direction MD is larger than that due to expansion or contraction in the direction TD.

The solid polymer electrolyte membrane 18 is obtained by cutting the rolled solid polymer electrolyte membrane 18R into pieces each having a predetermined length. As described below, the winding direction (direction MD) in which the rolled solid polymer electrolyte membrane 18R is wound coincides with the longitudinal direction (direction of arrow B) of the resin frame member 24 (see FIG. 4).

As illustrated in FIG. 1, an oxidant gas inlet manifold 30a, a coolant inlet manifold 32a, and a fuel gas outlet manifold 34b are formed in the power generation cell 12 so as to extend in the direction of arrow A, which is the stacking direction, through one end portion of the power generation cell 12 in the direction of arrow B (horizontal direction). An oxidant gas, such as an oxygen-containing gas, is supplied through the oxidant gas inlet manifold 30a. A coolant is supplied through the coolant inlet manifold 32a. A fuel gas, such as a hydrogen-containing gas, is discharged through the fuel gas outlet manifold 34b. The oxidant gas inlet manifold 30a, the coolant inlet manifold 32a, and the fuel gas outlet manifold 34b are arranged in the direction of arrow C (vertical direction).

A fuel gas inlet manifold 34a, a coolant outlet manifold 32b, and an oxidant gas outlet manifold 30b, are formed in the power generation cell 12 so as to extend in the direction of arrow A through the other end portion of the power generation cell 12 in the direction of arrow B. The fuel gas is supplied through the fuel gas inlet manifold 34a. The coolant is discharged through the coolant outlet manifold 32b. The oxidant gas is discharged through the oxidant gas outlet manifold 30b. The fuel gas inlet manifold 34a, the coolant outlet manifold 32b, and the oxidant gas outlet manifold 30b are arranged in the direction of arrow C.

An oxidant gas channel 36, which is connected to the oxidant gas inlet manifold 30a and the oxidant gas outlet manifold 30b, is formed on a surface 16a of the second separator 16 facing the resin-framed membrane electrode assembly 10 so as to extend in the direction of arrow B.

A fuel gas channel 38, which is connected to the fuel gas inlet manifold 34a and the fuel gas outlet manifold 34b, is formed on a surface 14a of the first separator 14 facing the resin-framed membrane electrode assembly 10 so as to extend in the direction of arrow B. The supply pressure of the fuel gas that flows through the fuel gas channel 38 is higher than the supply pressure of the oxidant gas that flows through the oxidant gas channel 36. In the stepped MEA 10a, a differential pressure (inter-electrode differential pressure) is generated between the anode electrode 20 and the cathode electrode 22 due to the difference between the supply pressures of the reactant gases. The oxidant gas and the fuel gas flow in opposite directions with the solid polymer electrolyte membrane 18 therebetween (counter flow).

A coolant channel 40, which is connected to the coolant inlet manifold 32a and the coolant outlet manifold 32b, is formed between a surface 14b of the first separator 14 of the power generation cell 12 and a surface 16b of the second separator 16 of an adjacent power generation cell 12 so as to extend in the direction of arrow B.

As illustrated in FIGS. 1 and 2, a first sealing member 42 is integrally formed on the surfaces 14a and 14b of the first separator 14 so as to surround the outer edge of the first separator 14. A second sealing member 44 is integrally formed on the surfaces 16a and 16b of the second separator 16 so as to surround the outer edge of the second separator 16.

As illustrated in FIG. 2, the first sealing member 42 includes a first protruding seal 42a, which is in contact with the resin frame member 24 of the resin-framed membrane electrode assembly 10, and a second protruding seal 42b, which is in contact with the second sealing member 44 of the second separator 16. A surface of the second sealing member 44 that is in contact with the second protruding seal 42b forms a planar seal that extends in a planar shape along the separator surface. Instead of the second protruding seal 42b, a protruding seal (not shown) may be formed on the second sealing member 44.

The first sealing member 42 and the second sealing member 44 are each made of an elastic material, such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene rubber, and acrylic rubber.

Hereinafter, an operation of the power generation cell 12 having such a structure will be described.

First, as illustrated in FIG. 1, an oxidant gas, such as an oxygen-containing gas, is supplied to the oxidant gas inlet manifold 30a, and a fuel gas, such as a hydrogen-containing gas, is supplied to the fuel gas inlet manifold 34a. A coolant, such as pure water, ethylene glycol, or oil, or the like, is supplied to the coolant inlet manifold 32a.

The oxidant gas flows through the oxidant gas inlet manifold 30a into the oxidant gas channel 36 of the second separator 16, flows in the direction of arrow B, and is supplied to the cathode electrode 22 of the stepped MEA 10a. The fuel gas flows through the fuel gas inlet manifold 34a into the fuel gas channel 38 of the first separator 14. The fuel gas flows along the fuel gas channel 38 in the direction of arrow B and is supplied to the anode electrode 20 of the stepped MEA 10a.

Accordingly, in the stepped MEA 10a, the oxidant gas supplied to the cathode electrode 22 and the fuel gas supplied to the anode electrode 20 are consumed in electrochemical reactions in the second electrode catalyst layer 22a and the first electrode catalyst layer 20a, and thereby electric power is generated.

Next, the oxidant gas suppled to the cathode electrode 22 and consumed is discharged through the oxidant gas outlet manifold 30b in the direction of arrow A. Likewise, the fuel gas supplied to the anode electrode 20 and consumed is discharged through the fuel gas outlet manifold 34b in the direction of arrow A.

The coolant supplied to the coolant inlet manifold 32a flows into the coolant channel 40 between the first separator 14 and the second separator 16 and flows in the direction of arrow B. The coolant cools the stepped MEA 10a, and then the coolant is discharged through the coolant outlet manifold 32b.

In the present embodiment, as illustrated in FIG. 4, the clearance CL includes a short-side portion 46a, which is adjacent to the oxidant gas inlet manifold 30a and which extends in the direction of arrow C. The clearance Cl includes a pair of upper and lower long-side portions 46b, which extend in the direction of arrow B, and a short-side portion 46c, which is adjacent to the oxidant gas outlet manifold 30b and which extends in the direction of arrow C.

Figure 6:
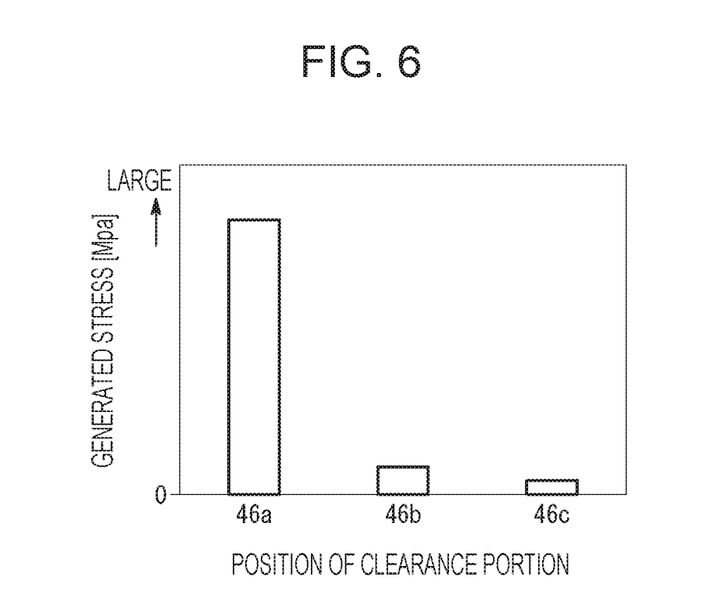
FIG. 6 is a graph illustrating stresses generated in the solid polymer electrolyte membrane at different portions of an inner peripheral surface of the resin frame member.

FIG. 6 shows the relationship among stresses generated in the solid polymer electrolyte membrane 18 at the short-side portion 46a, the long-side portions 46b, and the short-side portion 46c. The stress generated at the short-side portion 46a, which is adjacent to the oxidant gas inlet manifold 30a, is the largest, because a change in humidity is large. Therefore, a change in the dimensions, due to expansion or contraction, of a portion of the solid polymer electrolyte membrane 18 disposed at the short-side portion 46a is larger than those of the other portions. The stresses generated at the long-side portions 46b and the short-side portion 46c are small, because a change in humidity is comparatively small.

For this reason, as illustrated in FIG. 4, the direction MD of the solid polymer electrolyte membrane 18 is made to coincide with the short-side portion 46a, which is a side at which the largest stress is generated in the solid polymer electrolyte membrane 18. In other words, the winding direction (direction MD) in which the rolled solid polymer electrolyte membrane 18R is wound coincides with the longitudinal direction (direction of arrow B) of the resin frame member 24.

Accordingly, because the dimensions of the resin frame member 24 change by a comparatively large amount in the longitudinal direction due to a change in temperature, a large tension is applied to a portion of the solid polymer electrolyte membrane 18 disposed at the short-side portion 46a of the clearance CL. Regarding the solid polymer electrolyte membrane 18, due to a change in humidity, in particular, a portion of the solid polymer electrolyte membrane 18 disposed at the short-side portion 46a of the clearance CL expands or contracts by a large amount, and a large tension is applied.

Thus, a larger stress is generated in the portion of the solid polymer electrolyte membrane 18 corresponding to the short-side portion 46a of the clearance CL than in the portions of the solid polymer electrolyte membrane corresponding to the long-side portion 46b and the other short-side portion 46c of the clearance CL. Therefore, by only checking for the presence of breakage in one short-side portion 46a of the solid polymer electrolyte membrane 18, the presence of breakage in the entirety of the solid polymer electrolyte membrane 18 can be reliably checked. Accordingly, it is possible to reliably perform breakage check of the solid polymer electrolyte membrane 18 in the clearance CL in a short time.

A resin-framed membrane electrode assembly for a fuel cell according to the present disclosure includes a rectangular stepped MEA and a rectangular resin frame member. The stepped MEA includes a solid polymer electrolyte membrane, a first electrode that is disposed on one surface of the solid polymer electrolyte membrane and that includes a first electrode catalyst layer and a first gas diffusion layer, and a second electrode that is disposed on the other surface of the solid polymer electrolyte membrane and that includes a second electrode catalyst layer and a second gas diffusion layer. Planar dimensions of the first electrode are larger than those of the second electrode. The resin frame member surrounds an outer periphery of the solid polymer electrolyte membrane.

The resin frame member includes an inwardly-protruding portion that protrudes toward the second electrode. A clearance is formed between an outer edge of the second gas diffusion layer and an inner edge of the inwardly-protruding portion. The solid polymer electrolyte membrane is obtained by cutting a rolled solid polymer electrolyte membrane. A winding direction in which the rolled solid polymer electrolyte membrane is wound coincides with a longitudinal direction of the resin frame member.

Preferably, the first electrode is an anode electrode to which a fuel gas is supplied, and the second electrode is a cathode electrode to which an oxidant gas is supplied. In this case, preferably, a supply pressure of the fuel gas supplied to the first electrode is higher than a supply pressure of the oxidant gas supplied to the second electrode.

A fuel cell according to the present disclosure includes the resin-framed membrane electrode assembly and a rectangular separator. The separator includes an oxidant gas inlet manifold that is located adjacent to one short side of the resin frame member and through which an oxidant gas flows in a stacking direction in which the resin-framed membrane electrode assembly and the separator are stacked. The separator includes an oxidant gas outlet manifold that is located adjacent to the other short side of the resin frame member and through which the oxidant gas flows in the stacking direction.

In the solid polymer electrolyte membrane according to the present disclosure, the winding direction in which the rolled solid polymer electrolyte membrane is wound coincides with the longitudinal direction of the resin frame member. Therefore, a direction in which a change in the dimensions of the resin frame member is large coincides with a direction in which a change in the dimensions of the solid polymer electrolyte membrane is large.

Accordingly, because the dimensions of the resin frame member change by a comparatively large amount in the longitudinal direction due to a change in temperature, a large tension is applied to the solid polymer electrolyte membrane disposed at a short side of the clearance. Due to a change in humidity, the solid polymer electrolyte membrane expands or contracts by a large amount in the transverse direction of the resin frame member than in the longitudinal direction of the resin frame member. Therefore, a large tension is applied to a portion of the solid polymer electrolyte membrane disposed at the short side of the clearance.

Thus, a larger stress is generated in a short-side portion of the solid polymer electrolyte membrane, corresponding to the short side of the clearance, than in a long-side portion of the solid polymer electrolyte membrane, corresponding to a long side of the clearance. Therefore, by only checking for the presence of breakage in the short-side portion of the solid polymer electrolyte membrane, the presence of breakage in the entirety of the solid polymer electrolyte membrane can be reliably checked. Accordingly, it is possible to reliably perform breakage check of the solid polymer electrolyte membrane in the clearance in a short time.

Obviously, numerous modifications and variations of the present invention are possible in light of the above teachings. It is therefore to be understood that within the scope of the appended claims, the invention may be practiced otherwise than as specifically described herein.

What is claimed is:

1. A checking method of a resin-framed membrane electrode assembly for a fuel cell, the resin-framed membrane electrode assembly comprising:
    a rectangular stepped membrane electrode assembly comprising:
        a solid polymer electrolyte membrane made from a solid polymer electrolyte membrane roll in which a solid polymer electrolyte membrane sheet is wound in a winding direction, the solid polymer electrolyte membrane having a first surface, a second surface opposite to the first surface in a stacking direction, and an outer peripheral surface connecting the first surface and the second surface;
        a first electrode disposed on the first surface of the solid polymer electrolyte membrane in the stacking direction; and
        a second electrode which is disposed on the second surface of the solid polymer electrolyte membrane and which has a size smaller than a size of the first electrode viewed in the stacking direction, the second electrode comprising:
            a second electrode catalyst layer provided on the second surface of the solid polymer electrolyte membrane in the stacking direction; and
            a second gas diffusion layer provided on the second electrode catalyst layer in the stacking direction; and
    a resin frame member having a rectangular peripheral shape and a rectangular window therein viewed in the stacking direction, the rectangular stepped membrane electrode assembly being provided in the rectangular window so that the outer peripheral surface of the solid polymer electrolyte membrane is surrounded by the resin frame member, the resin frame member including an inwardly-protruding peripheral portion which protrudes toward an outer peripheral edge of the second electrode, the inwardly-protruding peripheral portion having an inner peripheral edge facing the outer peripheral edge of the second gas diffusion layer with a clearance therebetween, the rectangular peripheral shape having longitudinal sides which extend in the winding direction and short sides shorter than the longitudinal sides,
    the checking method comprising:
        checking whether there is breakage in one of the short sides of the rectangular peripheral shape in the clearance without checking breakage in any other part than the one of the shorter sides in the clearance.

2. The checking method according to claim 1,
    wherein the first electrode is an anode electrode to which a fuel gas is supplied,
    wherein the second electrode is a cathode electrode to which an oxidant gas is supplied, and
    wherein the one of the short sides of the rectangular peripheral shape is closer to an inlet of the oxidant gas than to an outlet of the oxidant gas.

3. The checking method according to claim 2, wherein a supply pressure of the fuel gas supplied to the first electrode is higher than a supply pressure of the oxidant gas supplied to the second electrode.

4. The checking method according to claim 1, wherein the first electrode catalyst layer is provided on the first surface of the solid polymer electrolyte membrane, and the first gas diffusion layer is provided on the first electrode catalyst layer.

5. The checking method according to claim 1,
    wherein the inner peripheral edge is formed so as to include a curved surface at a corner of the inner peripheral edge, the curved surface is a curved surface with a radius when viewed in a direction orthogonal to the stacking direction.

6. The checking method according to claim 5,
    wherein the curved surface extends along the longitudinal sides.

7. The checking method according to claim 6,
    further comprising an adhesive disposed in the clearance and between the inner peripheral edge and the second electrode catalyst layer,
    wherein the curved surface directly contacts the adhesive disposed in the clearance.

8. The checking method according to claim 5,
    further comprising an adhesive disposed in the clearance and between the inner peripheral edge and the second electrode catalyst layer,
    wherein the curved surface directly contacts the adhesive disposed in the clearance.

* * * * *